United States Patent
Grabb et al.

(10) Patent No.: US 6,292,518 B1
(45) Date of Patent: Sep. 18, 2001

(54) USE OF 64-QAM CIRCUITRY FOR RECEIVING AND DECODING 8-VSB SIGNALS

(75) Inventors: Mark Lewis Grabb, Burnt Hills; Kenneth Brakeley Welles, II, Scotia; John Erik Hershey, Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/422,446

(22) Filed: Oct. 21, 1999

(51) Int. Cl.⁷ .................................................. H03D 1/24
(52) U.S. Cl. ......................... 375/321; 375/324; 329/304; 329/357; 348/726
(58) Field of Search ............................ 375/321, 261, 375/298, 301, 324; 332/103; 329/304, 357; 348/641, 726

(56) References Cited

U.S. PATENT DOCUMENTS 5,477,199 * 12/1995 Montreuil ........................... 332/103
5,673,293 * 9/1997 Scarpa et al. ........................ 375/321
6,067,329 * 5/2000 Kato et al. ........................... 375/321

* cited by examiner

Primary Examiner—Temesghen Ghebretinsae
(74) Attorney, Agent, or Firm—Jill M. Breedlove; Douglas E. Stoner

(57) ABSTRACT

An N-VSB (vestigial sideband) modulation signal is converted into an M-QAM (quadrature amplitude modulation) signal, where $M=N^2$, by shifting the symbol rate frequency of a received N-VSB modulation signal to center the waveform spectrum about zero Hertz prior to complex demodulation so that data symbols will alternately appear on demodulated I and Q channels. A pilot tone of the received N-VSB modulation signal is removed to eliminate any bias in the both I and Q channels. Symbol timing between I and Q channels is offset, and quadrature amplitude demodulation of the I and Q channel signals generate alternating I and Q channel data symbols. Alternating inversion of the alternating I and Q channel data symbols recovers the N-VSB symbol data.

12 Claims, 3 Drawing Sheets

USE OF 64-QAM CIRCUITRY FOR RECEIVING AND DECODING 8-VSB SIGNALS

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to digital television (DTV) and, in particular, to use of 64-QAM (quadrature amplitude modulation) receiver design methodologies in the reception of 8-VSB (vestigial sideband) signals as specified in the Advanced Television Standards Committee (ATSC) television standards.

2. Background Art

Digital television (DTV) signals in the USA are broadcast using the Advanced Television Standards Committee (ATSC) television standard modulation system which is eight level vestigial sideband (8-VSB) modulation with a suppressed carrier signal. Conventional 8-VSB receiver designs complex demodulate the received signal with a pilot tone on zero frequency. Under ideal channel conditions, this allows the data symbols to stream on only one of two complex demodulated channels (known as I-channel only processing).

BRIEF SUMMARY OF THE INVENTION

An 8-VSB receiver designed using methodologies of 64-QAM receiver design converts the received 8-VSB modulation into a signal which can be processed by circuitry intended to decode 64 level quadrature amplitude modulation (64-QAM) signals. This results in a better signal to noise ratio (SNR) reception than the conventional I-channel only decoding circuitry of most 8-VSB receivers. This methodology also allows use of training and equalizing algorithms developed for 64-QAM which are superior to equivalent algorithms for 8-VSB receivers. The invention can be generalized to N-VSB conversion into M-QAM where $M=N^2$.

The MPEG-2 (Motion Picture Experts Group) packets comprise 208 bytes or 1664 bits corresponding to 832 symbols. There are eight symbol levels. A pilot tone is included in the 8-VSB signal design. The symbol values entering a zero-ISI( )VSB filter are offset by a DC value to generate the pilot tone. This approach causes the pilot tone to have a particular phase with respect to the symbol detection timing. Present receiver implementations may cause this phase to be of no consequence when I-channel only receiver processing is conducted, because the pilot tone is used for frequency acquisition only.

DETAILED DESCRIPTION OF THE INVENTION

8-VSB modulation can be converted (one-to-one reversible mapping) to 64-QAM through four independent steps. (which are not necessarily order dependent):

¼ symbol rate frequency shift removal of pilot tone symbol timing offset between I and Q channels alternating inversion of data symbols By implementing each or some of these conversions, the 8-VSB waveform may be processed using methodologies commonly applied to 64-QAM receiver designs.

¼ Symbol Rate Frequency Shift

Common 8-VSB receiver designs complex demodulate the received signal with a pilot tone centered on zero frequency. Under ideal channel conditions, this allows the data symbols to stream on only one of the two complex demodulated channels (known as I-channel only processing). By shifting the waveform by ¼ the symbol rate in frequency and thus centering the waveform spectrum about zero Hertz prior to complex demodulation, data symbols will alternately appear on the demodulated I and Q channels of the complex demodulation circuitry. These data symbols will occur on each of the two channels at half the symbol rate. These data symbols are not directly the 8-VSB symbols; however, a direct mapping is achieved through two more steps (pilot tone and alternating inversion of data symbols).

Pilot Tone

The standard implementation for adding a pilot tone (DC offset) causes the symbols on the I and Q channels to alternate with a positive and negative bias. Other implementations of the pilot tone can be used to significant advantage at the receiver. That is, the phase of the pilot tone can be constructed to have no impact on the I-channel symbols and maximum bias impact on the Q-channel symbols. This can be used to aid the receiver in phase synchronization as well as other receiver processing. Removal of the pilot tone eliminates the bias in both the I and Q channels.

Alternating Inversion of Symbols

Using Euler's formula, $$e^{j2\pi f_\alpha t} = \cos(2\pi f_\alpha t) + j \sin(2\pi f_\alpha t),$$

where $f_\alpha$ is 2.69 MHz, results in a complex frequency shift of ¼ the symbol rate and the data symbols on each of the I and Q complex demodulated channels are inverted (multiplied by −1) on every other symbol. By synchronizing to the pilot tone, this inversion can be inverted to obtain the original 8-VSB symbol stream within the 64-QAM receiver structure.

Symbol Timing and Offset Between I and Q Channels

In addition to the three other transformations to map 64-QAM to 8-VSB and vice versa, the symbols between the I and Q channels will be offset by the original 8-VSB symbol rate. The receiver architectures to implement this re-alignment are common. Modulations of this type are commonly called "offset". An appropriate delay is added to one of the complex demodulated channels to align the appropriate sampling times on the complex waveform. This is common in OQPSK (Offset Quadrature Phase Shift Keying) receiver design.

Implementation

Figure 1:
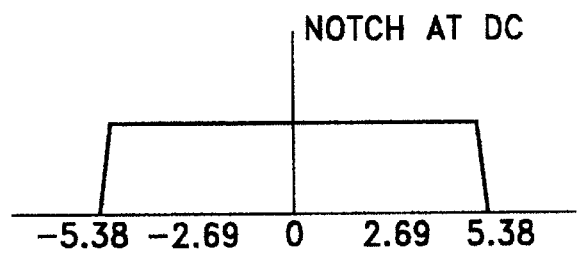
FIG. 1 is a graphical representation of the frequency spectrum of an 8-level pulse amplitude modulated signal.
Figure 2:
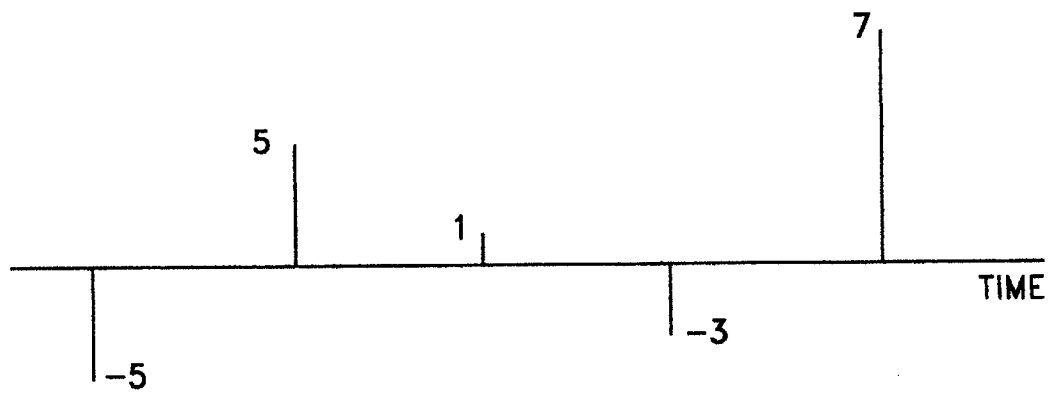
FIG. 2 is a graphical representation of a typical data segment of an 8-VSB signal.

The 8-VSB signal spectrum is shown in FIG. 1. The MPEG-2 packets comprise 208 bytes or 1664 bits corresponding to 832 symbols. There are eight symbol levels (−7, −5, −3, −1, 1, 3, 5, 7), as shown in FIG. 2.

Figure 3:
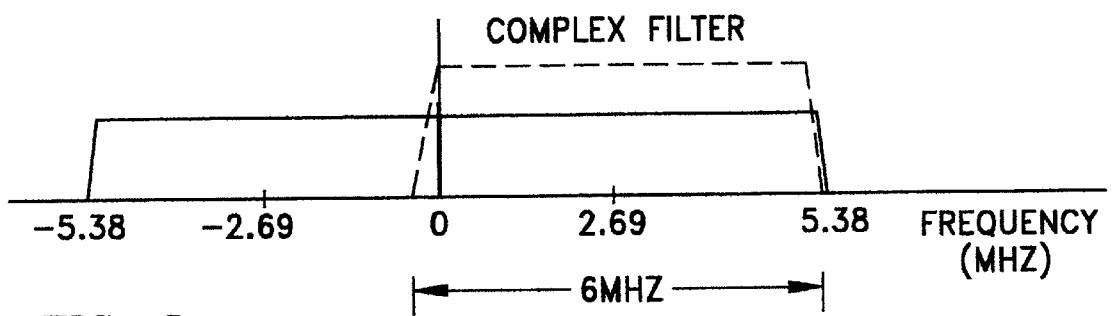
FIG. 3 is a graphical representation of a complex filter used to convert the 8-level pulse amplitude modulated signal into an 8-VSB signal.

The symbol values entering a zero-ISI VSB filter are offset by a DC value to generate the pilot tone for the 8-VSB signal, causing the pilot tone to have a particular phase with respect to the symbol detection timing. A complex filter used to generate the I-channel is illustrated in FIG. 3.

Figure 4:
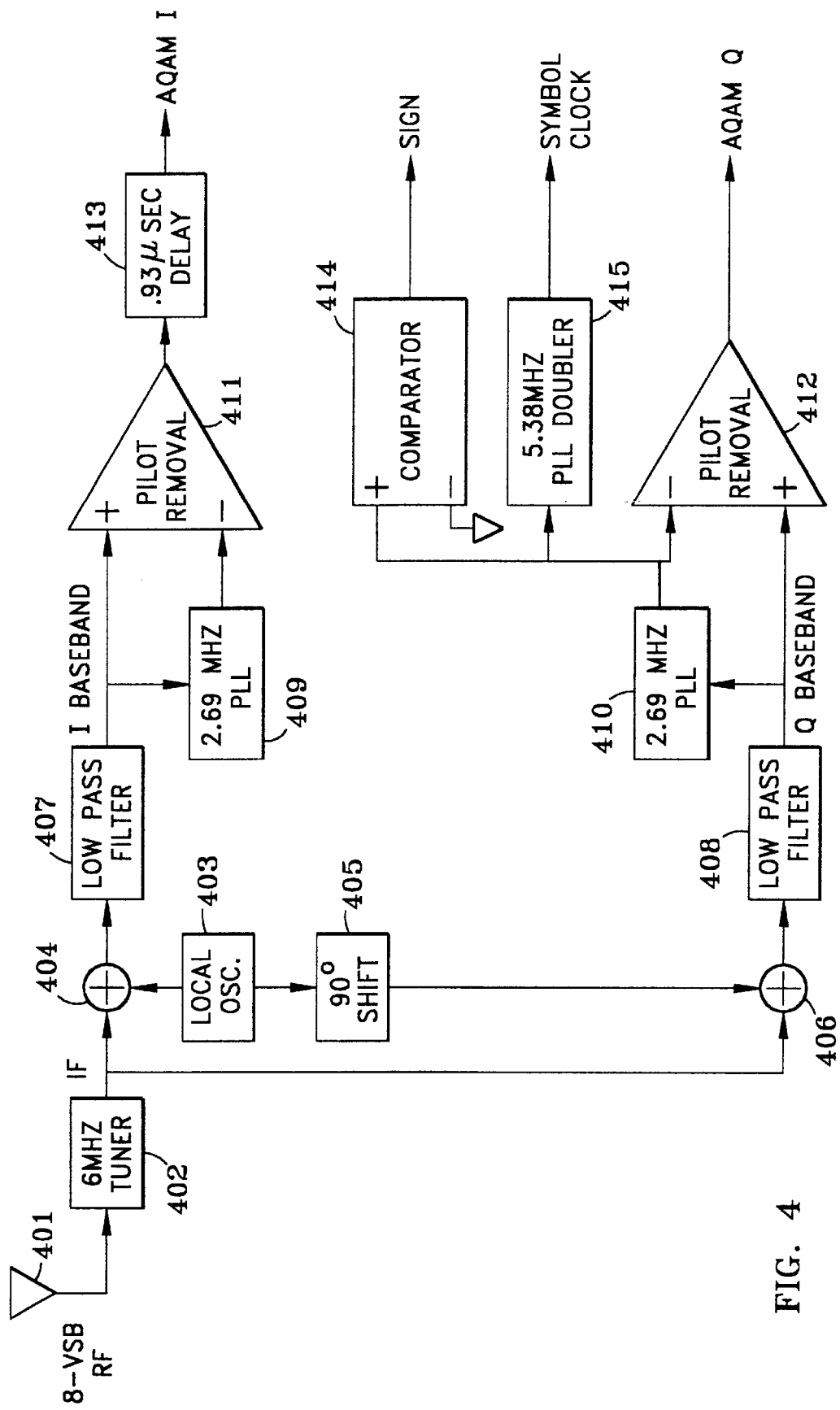
FIG. 4 is a block diagram of an illustrative system for converting the rec ed 8-VSB signal to alternating quadrature signals according to a preferred embodiment of the invention.

FIG. 4 shows an implementation of the invention. An antenna 401 picks up an 8-VSB digital signal such as that defined by the ATSC digital television broadcast standard. A tuner 402 puts this signal out at an intermediate frequency (IF) signal that has been bandpass filtered, as is well known in conventional television receiver circuitry. A local oscillator 403 operating at the intermediate frequency is mixed in phase in a mixer 404 and, via a 90° phase shifter 405, in quadrature in a mixer 406 with the 8-VSB signal. The two mixer output signals pass through low pass filters 407 and 408, respectively, resulting in I and Q baseband signals. Each of these baseband signals goes into separate respective 2.69 MHz PLLs (Phase Locked Loops) 409 and 410 which lock onto the suppressed carrier signal and detect the pilot signal. Operational amplifiers 411 and 412 then remove the pilot signal from the I and Q signals. The signal on the I path undergoes a 0.93 microsecond delay relative to the signal on the Q path in a delay circuit 413, such as a surface acoustic wave (SAW) delay device. This generates AQAM-I and AQAM-Q (Alternating Quadrature Amplitude Modulation) signals. The output signal of PLL 410 in the Q path is sent to a comparator 414 which generates a SIGN output signal that alternates between a logical "1" and a logical "0" when the detected pilot signal is positive and negative, respectively. The output signal of PLL 410 in the Q path is also sent to a 5.38 MHz PLL frequency doubler 415. The output signal of the frequency doubler is the symbol clock.

Figure 5:
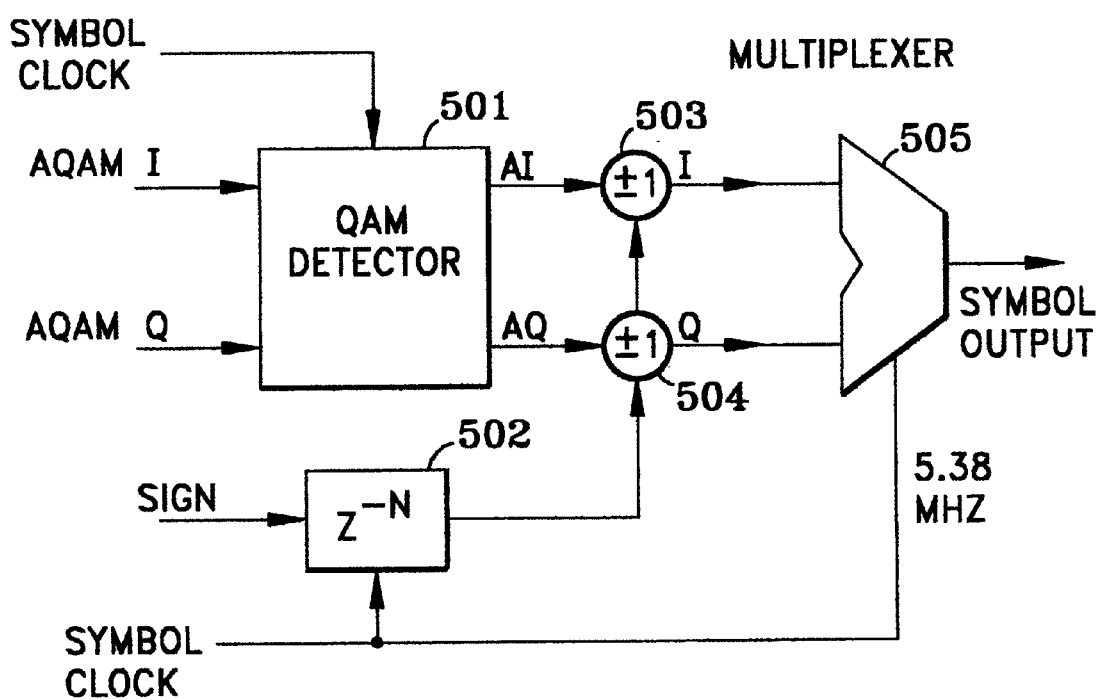
FIG. 5 is a block diagram of a quadrature amplitude modulation (QAM) detector and multiplexer for generating the recovered 8-VSB data symbol output.

FIG. 5 shows the AQAM-I and AQAM-Q signals going into a QAM detector 501. The circuitry for this QAM detector may be any circuitry for a conventional QAM detector which is well known and well understood in the field of communications. The AQAM signals going into the QAM detector 501 have all of the characteristics of normal QAM signals and may be treated as such.

QAM detector 501 puts out an I and a Q decision once per symbol clock. These are labeled "AI" and "AQ" for alternating I and Q because the symbol values from the QAM are alternately the positive and negative representation of the 8-VSB signals originally encoded in the radio frequency (RF) transmission. The SIGN output signal from amplifier 414, shown in FIG. 4, is delayed by N symbol clocks in a delay 502, where N is the delay introduced into signals passing from the input to the output of QAM detector 501. The delayed SIGN signal is used to control inverter circuits 503 and 504 to alternate the sign of the digital representation of the signals coming from QAM detector 501. The sign corrected I and Q symbol values are multiplexed in a multiplexer 505 by the symbol clock, which switches at a 5.38 MHz clock rate. This means that the data rate of the data presented on the output of the multiplexer (SYMBOL OUTPUT) is 10.69 MHz. These symbol data are the recovered 8-VSB symbol data in the proper order and with the proper sign.

The implementation shown in FIGS. 4 and 5 uses mostly analog circuitry for purposes of illustration. A digital implementation as well as a software based implementation may be constructed as well, which will be evident to those skilled in the digital television arts. Further, as mentioned above, the invention can be generalized to N-VSB conversion to M-QAM where $M=N^2$.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is:

1. A method for recovering an N-VSB (vestigial sideband) modulation signal from M-QAM (quadrature amplitude modulation) signal, where $M=N^2$, comprising the steps of:

shifting a symbol rate frequency of a received N-VSB modulation signal containing symbol data to center the waveform spectrum about zero Hertz prior to complex demodulation so that data symbols will alternately appear on demodulated I and Q channels;

removing a pilot tone from the received N-VSB modulation signal to eliminate any bias in both the I and Q channels;

offsetting symbol timing between the I and Q channels;

quadrature amplitude demodulating signals on the I and Q channels to generate alternating I and Q channel data symbols; and alternating inversion of the alternating I and Q channel data symbols to recover the N-VSB symbol data.

2. The method of claim 1, wherein N=8, M=64 and the symbol rate of the received N-VSB modulation signal is shifted by ¼ symbol rate.

3. The method of claim 1, further comprising the step of combining the alternating inversion of the I and Q channel data.

4. A digital television receiver which recovers an N-VSB (vestigial sideband) modulation signal from an M-QAM (quadrature amplitude modulation) signal, where $M=N^2$, comprising:

a first circuit for shifting a symbol rate frequency of a received N-VSB modulation signal to center the waveform spectrum about zero Hertz prior to complex demodulation so that data symbols will alternately appear on demodulated I and Q channels;

a second circuit for removing a pilot tone of the received N-VSB modulation signal to eliminate any bias in both I and Q channels;

a third circuit for offsetting symbol timing between the I and Q channels;

a quadrature amplitude detector for demodulating the I and Q channel signal to generate alternating I and Q channel data symbols; and an inverter circuit for inverting alternating I and Q channel data symbols to recover the N-VSB symbol data.

5. The digital television receiver recited in claim 4, wherein the first circuit comprises first and second mixers for receiving an intermediate frequency signal and, respectively, an in phase and quadrature phase local oscillator signal for generating I and Q channel output signals at baseband.

6. The digital television receiver recited in claim 5, wherein the second circuit comprises, in each of said I and Q channels, a pilot signal detector and a subtractor for subtracting a detected pilot signal from respective I and Q channel output signals.

7. The digital television receiver recited in claim 6, wherein the third circuit comprises a first delay in the I channel.

8. The digital television receiver recited in claim 7, wherein the first delay comprises a surface acoustic wave device.

9. The digital television receiver recited in claim 7, further comprising a sign generator and a symbol clock generator responsive to one of said pilot signal detectors and a second delay responsive to a symbol clock from the symbol clock generator to delay a sign output signal of the sign generator.

10. The digital television receiver recited in claim 9, wherein the quadrature amplitude demodulator is adapted to demodulate signals in the I and Q channels in response to the symbol clock generator, said inverter circuit being responsive to the delayed sign output signal to generate I and Q output signals.

11. The digital television receiver recited in claim 10, further comprising a multiplexer responsive to the symbol clock generator for combining the I and Q output signals of the inverter to recover the N-VSB symbol data.

12. The digital television receiver recited in claim 11, wherein N=8 and M=64.

\* \* \* \* \*